United States Patent
Gerkin et al.

(10) Patent No.: US 6,600,001 B1
(45) Date of Patent: Jul. 29, 2003

(54) ALKYLAMINO OXAMIDES AS LOW ODOR, NON-FUGITIVE CATALYSTS FOR THE PRODUCTION OF POLYURETHANES

(75) Inventors: Richard M. Gerkin, Cross Lanes, WV (US); Karena Kaye Robinson, Charleston, WV (US); Edmond J. Dererian, Charleston, WV (US)

(73) Assignee: Crompton Corporation, Middlebury, CT (US)

( * ) Notice: Subject to any disclaimer, the term of this patent is extended or adjusted under 35 U.S.C. 154(b) by 0 days.

(21) Appl. No.: 10/042,218

(22) Filed: Jan. 11, 2002

(51) Int. Cl.$^7$ .............................................. C08G 18/18
(52) U.S. Cl. ............................ 528/53; 528/49; 528/85; 521/118; 521/129; 521/164
(58) Field of Search ............................ 528/53, 49, 85; 521/129, 118, 164

(56) References Cited

U.S. PATENT DOCUMENTS

| | | | | |
|---|---|---|---|---|
| 3,073,787 A | 1/1963 | Krakler | ...................... | 260/2.5 |
| 3,234,153 A | 2/1966 | Britain | ...................... | 260/2.5 |
| 3,243,389 A | 3/1966 | Moller et al. | ................. | 260/2.5 |
| 3,543,306 A | 11/1970 | Biland | ...................... | 260/45.8 |
| 3,784,599 A | 1/1974 | Jefferies et al. | ............. | 260/242 |
| 4,007,140 A | 2/1977 | Ibbotson | .................... | 260/2.5 |
| 4,049,591 A | 9/1977 | McEntire et al. | ............. | 260/2.5 |
| 4,194,069 A | 3/1980 | Speranza et al. | ........... | 521/129 |
| 4,348,536 A | 9/1982 | Blahak et al. | ............... | 560/169 |
| 4,644,017 A | 2/1987 | Haas et al. | .................. | 521/129 |
| 5,489,618 A | 2/1996 | Gerkin | ........................ | 521/128 |
| 5,824,711 A | 10/1998 | Kimock et al. | ............. | 521/129 |
| 6,077,877 A | 6/2000 | Gerkin et al. | ............... | 521/129 |

FOREIGN PATENT DOCUMENTS

| | | |
|---|---|---|
| DE | 3027796 A1 | 2/1982 |
| EP | 0327379 A2 | 8/1989 |
| EP | 0645226 A2 | 3/1995 |
| EP | 0575836 B1 | 5/1997 |
| SE | 483461 | 2/1970 |

OTHER PUBLICATIONS

Zimmerman et al., Factors Affecting the Discoloration of Vinyl that has been Molded Against Urethane Foam, Polyurethanes World Congress, 1987, pp. 693–697.

*Primary Examiner*—Rachel Gorr
(74) *Attorney, Agent, or Firm*—Michael P. Dilworth

(57) ABSTRACT

A process for the synthesis of polyurethanes is disclosed wherein the process comprises reacting polyurethane-forming reactants in the presence of an effective amount of a catalyst comprising at least one alkylamino oxainide of the structure:

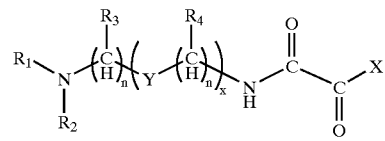

wherein:

$R_1$ and $R_2$ are independently selected alkyl groups or can be taken together to form a five or six-membered heterocyclic ring;

$R_3$ and $R_4$ are independently selected from the group consisting of hydrogen and alkyl;

n is 2 or 3;

x is 0 or 1;

Y is selected from the group consisting of O and $NR_9$, wherein:

$R_9$ is selected from the group consisting of hydrogen and alkyl; and

X is selected from the group consisting of $OR_{10}$ and G, wherein:

$R_{10}$ is selected from the group consisting of hydrogen and alkyl; and

G is

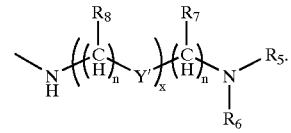

16 Claims, No Drawings

ALKYLAMINO OXAMIDES AS LOW ODOR, NON-FUGITIVE CATALYSTS FOR THE PRODUCTION OF POLYURETHANES

BACKGROUND OF THE INVENTION

1. Field of the Invention

The present invention is directed to alkylamino oxamides that are derived from the condensation of primary N,N-(dialkylaminoalkyl)amines (or mixtures of primary N,N-(dialkylaminoalkyl)amines) with oxalate esters (or oxalic acid). There is thus provided a class of catalysts containing active hydrogen groups that have unique utility as low odor, non-fugitive catalysts for the preparation of polyurethanes. The use of these catalysts permits the preparation of urethane foams having improved physical properties relative to those obtained using conventional amine catalysts.

2. Description of Related Art

Polyurethane foams are produced by allowing a polyisocyanate to react with a compound containing two or more active hydrogen groups. The active hydrogen-containing compounds are typically polyether or polyester polyols, primary and/or secondary polyetheramines, and water. Two major reactions occur between these reactants during the preparation of polyurethane foam. These reactions must proceed simultaneously and at a competitively balanced rate during the process in order to yield polyurethane foam with desired physical characteristics.

Reaction between the isocyanate and the polyol or polyamine, usually referred to as the gel reaction, leads to the formation of a polymer of high molecular weight. This reaction is predominant in solid polyurethane elastomers and in foams blown exclusively with low boiling point organic compounds such as methylene chloride or pentane. This reaction increases the viscosity of the mixture and generally contributes to crosslink formation when polyfunctional polyols, polyamines or polyisocyanates are used.

The second major reaction occurs between the isocyanate and water. This reaction also adds to urethane polymer growth, and is important for producing carbon dioxide gas, which promotes foaming. As a result, this reaction often is referred to as the blow reaction. Both blow and gel reactions occur in foams blown partially or totally with carbon dioxide gas. In fact, the in situ generation of carbon dioxide by the blow reaction plays an essential part in the preparation of "one-shot", water blown polyurethane foams. Water-blown polyurethane foams, particularly flexible foams, are produced using either molded or slabstock foam processes.

In order to obtain good urethane foam structure and properties, the gel and blow reactions must proceed simultaneously and at optimum balanced rates. For example, if the carbon dioxide evolution is too rapid in comparison with the gel reaction, the foam tends to collapse. Alternatively, if the gel reaction is too rapid in comparison with the blow reaction generating carbon dioxide, foam rise will be restricted, thus resulting in a high-density foam. Also, poorly balanced crosslinking (gel) reactions will have an adverse effect on foam stability. In practice, the balancing of these two reactions is controlled by the nature of the catalysts used in the process.

Typically, the catalysts used for making polyurethanes are of two general types: tertiary amines (mono and poly) and organo-tin compounds. Organometallic tin catalysts predominantly favor the gelling reaction, while amine catalysts exhibit a more varied range of blow/gel balance. Using tin catalysts in flexible foam formulations also increases the quantity of closed cells contributing to foam tightness. Tertiary amines can be effective as catalysts for both the blow and the chain extension reactions and are often used in combination with the organic tin catalysts. Typical tertiary amine catalysts include bis-(dimethylaminoethyl)ether and triethylenediamine, among others, and typical organometallic compounds are stannous octoate and dibutyltindilaurate.

Most tertiary amines (including those noted above) used for the catalysis of polyurethane foam forming reactions are of the fugitive type. Fugitive amines are so designated because they are not bound to the urethane polymer matrix and, therefore, can leave the matrix under certain conditions. This fugitivity results in the emission of fumes from hot foam in both molded and slabstock foam processes. Airborne amine vapors can be an industrial hygiene problem in foam production plants. A particular effect of the amine vapor is glaucopsia, also known as blue-haze or halovision. It is a temporary disturbance of the clarity of vision. Fugitive amines can also cause problems, such as the fogging of automotive windshields, when they are used in the preparation of fully fabricated interior automotive parts. Many prior art fugitive amines also impart an unacceptably strong amine odor to the polyurethane foam. Because of these issues, there is increasing demand in the industry for low fugitivity, low odor catalysts.

Many approaches have been taken to define amine catalysts with reduced fugitivity. Some examples are given below.

Various active hydrogen containing polyurethane catalysts are described in the article: "Factors Affecting the Discoloration of Vinyl That Has Been Molded Against Urethane Foam", R. L. Zimmerman and T. L. Austin, Polyurethane World Congress, Sep. 29–Oct. 2, 1997, pp. 693–697, 1987.

U.S. Pat. No. 3,073,787 discloses the use of various propionamide derivatives as polyurethane catalysts.

U.S. Pat. No. 3,234,153 discloses the use of various acetamides as catalysts for the preparation of polyurethanes.

U.S. Pat. No. 3,243,389 discloses a variety of aminourethane and/or aminourea catalysts for the preparation of polyurethane plastics.

U.S. Pat. No. 3,784,599 discloses the use of water-soluble quaternary ammonium phthalocyanine dyestuffs useful in the dyeing art.

U.S. Pat. No. 4,007,140 discloses a tertiary amine having the general formula:

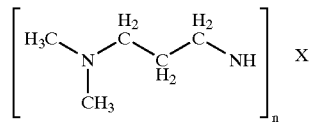

wherein X is the residue of an organic acid $X(OH)_n$, n being the number of acidic groups present in the acid. The amines are said to be useful as low odor catalysts in the production of polyurethanes.

U.S. Pat. No. 4,049,591 discloses compounds of the formula

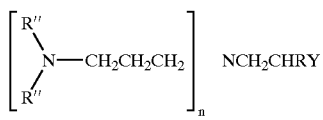

where n is 2, R" is lower alkyl, R is hydrogen or lower alkyl and Y is selected from the group consisting of CN, $CONH_2$, $CO_2R'$, $CONR_2$ and $COR'$ where R' independently is hydrogen, lower alkyl or aryl. A method of producing a polyurethane by utilizing said above compounds as catalysts in reacting an organic polyisocyanate with an organic polyester polyol or polyether polyol in the presence of said catalyst is also disclosed.

U.S. Pat. No. 4,194,069 discloses N-(3-dimethylaminopropyl)-N'-(3-morpholinopropyl)urea and a method of producing a polyurethane by utilizing this compound as a catalyst in reacting an organic polyisocyanate with an organic polyester polyol or polyether polyol in the presence of said catalyst.

U.S. Pat. No. 4,348,536 discloses compounds and the use thereof in producing polyurethane resins. The compounds correspond to the following formula:

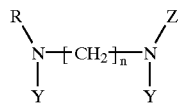

wherein n is an integer of from 1 to 5, R is a $C_1$–$C_5$ alkyl group, Y is a $C_1$–$C_5$ alkyl group or a

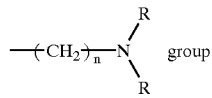

and Z is a

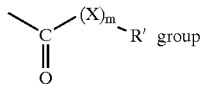

where n=0 or 1, X is —O— or

and R' is an aliphatic group having from 1 to 15 carbon atoms and may contain ester, ether, or amide groups or tertiary nitrogen and, when m=0, R' may be a hydrogen atom.

U.S. Pat. No. 4,644,017 discloses composite polyisocyanate addition products formed from (1) the reaction product of a compound having at least two isocyanate-reactive hydrogen atoms and a molecular weight of from 400 to 10,000, a polyisocyanate and a catalyst which is a diffusion stable amino alkyl urea having tertiary amino groups and corresponds to the formula

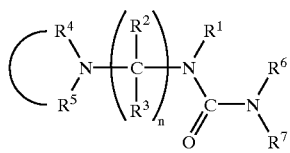

in which $R^1$, $R^2$, $R^3$, $R^4$, $R^5$, $R^6$, $R^7$ and n each represent specified groups or values and (2) another different material such as polyvinyl chloride, ABS, lacquers and textiles.

U.S. Pat. No. 5,489,618 discloses a process for preparing a polyurethane foam according to the one-shot foaming process by reactions between a polyisocyanate and an active hydrogen-containing component including water and an organic polyol wherein said reactions are conducted in the presence of a salt of a tertiary amine and a carboxylic acid having hydroxyl functionality.

U.S. Pat. No. 5,824,711 discloses a method for preparing a polyurethane foam which comprises reacting an organic polyisocyanate and a polyol in the presence of a blowing agent, a cell stabilizer and a catalyst composition that is an N,N,N'-trimethylbis(aminoethyl)ether substituted urea.

U.S. Pat. No. 6,077,877 discloses amine/amide catalysts for use in catalyzing the formation of polyurethane. The amine/amide catalysts, which have low fugitivity due to their reactivity with isocyanates, and good catalytic activity, have the structure

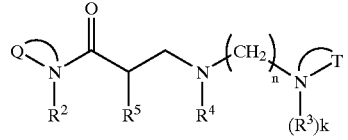

wherein Q is $C_zH_{2z+1}$, or $(CH_2)_nN(R^3)_kT$, T is a monovalent $C_1$–$C_4$ alkyl, amino-$C_1$–$C_4$-alkyl, mono-$C_1$–$C_4$-alkylamino-$C_1$–$C_4$-alkyl, or di-$C_1$–$C_4$-alkylamino-$C_1$–$C_4$-alkyl group, or T is a divalent alkyl, amine substituted alkyl, alkylaminoalkyl, or alkoxyalkyl group which forms with the nitrogen atom shown in structure (I) to which T is attached a cyclic structure which incorporates up to 6 carbon atoms in the ring as well as the nitrogen atom shown in structure (I), which cyclic structure may be substituted with $C_1$ to $C_4$ alkyl; k=0 or 1, being 1 if T is a monovalent group and 0 if T is a divalent group; $R^2$=H or $C_zH_{2z+1}$; $R^3$=$C_zH_{2z+1}$; $R^4$=H; $R^5$=H or $CH_3$; n=2 to 6; and z=1 to 4. Each $R^3$ and T may be the same or different, as may each value of n and z. One specific preferred range of structures is those in which Q is $C_zH_{2z+1}$.

DE 3,027,796 discloses a variety of dialkylaminoalkyl urea catalysts for preparation of polyurethane foams.

It is clear from the above that significant effort has been focused on the use of amine containing urea and amide derivatives as low fugitivity, low odor catalysts.

The present invention is directed to the use of a class of compounds that are known in the art (EP 575836, EP 327379, U.S. Pat. No. 3,543,306, CH 483461), but that have not been used as catalysts in the preparation of polyurethanes.

SUMMARY OF THE INVENTION

The present invention relates to a process for making polyurethanes (all types) using a class of low odor, non-fugitive amine catalysts heretofore not used in the prepara tion of such polyurethanes. The useful catalyst compounds are alkylamino oxamides of the general structure:

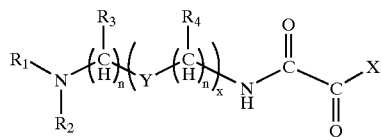

wherein:

$R_1$ and $R_2$ are independently selected alkyl groups or can be taken together to form a five or six-membered heterocyclic ring;

$R_3$ and $R_4$ are independently selected from the group consisting of hydrogen and alkyl;

n is 2 or 3;

x is 0 or 1;

Y is selected from the group consisting of O and $NR_9$, wherein:

$R_9$ is selected from the group consisting of hydrogen and alkyl; and

X is selected from the group consisting of $OR_{10}$ and G, wherein:

$R_{10}$ is selected from the group consisting of hydrogen and alkyl; and

G is

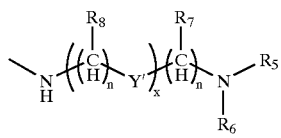

wherein:

$R_5$ and $R_6$ are independently selected alkyl groups or can be taken together to form a five or six-membered heterocyclic ring;

$R_7$ and $R_8$ are independently selected from the group consisting of hydrogen and alkyl;

n is 2 or 3;

x is 0 or 1; and

Y' is selected from the group consisting of O and $NR_{11}$, wherein $R_{11}$ is selected from the group consisting of hydrogen and alkyl.

Thus, where X is G, the general structure of the alkylamino oxamides used in the process of the present invention can be considered to be GCOCOG' wherein G and G' are the same if a single primary N,N-(dialkylaminoalkyl)amine is used and are different if a mixture of N,N-(dialkylaminoalkyl)amines is used.

The terminal tertiary nitrogens can also be part of ring structures, such as morpholines or imidazoles.

Admixtures of these alkylamino oxamides with at least one hydroxy carboxylic acid, such as salicylic acid, gluconic acid, dimethylol propionic acid, chloro-acetic acid, and the like can also be advantageously employed in the practice of the present invention.

More particularly, the present invention is directed to a process for the synthesis of polyurethanes comprising reacting polyurethane-forming reactants in the presence of an effective amount of a catalyst comprising at least one alkylamino oxamide of the structure:

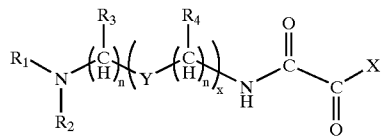

wherein:

$R_1$ and $R_2$ are independently selected alkyl groups or can be taken together to form a five or six-membered heterocyclic ring;

$R_3$ and $R_4$ are independently selected from the group consisting of hydrogen and alkyl;

n is 2 or 3;

x is 0 or 1;

Y is selected from the group consisting of O and $NR_9$, wherein:

$R_9$ is selected from the group consisting of hydrogen and alkyl; and

X is selected from the group consisting of $OR_{10}$ and G, wherein:

$R_{10}$ is selected from the group consisting of hydrogen and alkyl; and

G is

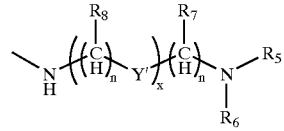

wherein:

$R_5$ and $R_6$ are independently selected alkyl groups or can be taken together to form a five or six-membered heterocyclic ring;

$R_7$ and $R_8$ are independently selected from the group consisting of hydrogen and alkyl;

n is 2 or 3;

x is 0 or 1; and

Y' is selected from the group consisting of O and $NR_{11}$, wherein $R_{11}$, is selected from the group consisting of hydrogen and alkyl.

DESCRIPTION OF THE PREFERRED EMBODIMENTS

As stated above the compounds employed in the practice of the present invention are broadly defined as alkylamino oxamides having the general structure:

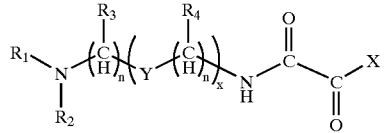

wherein:

$R_1$ and $R_2$ are independently selected alkyl groups or can be taken together to form a five or six-membered heterocyclic ring;

$R_3$ and $R_4$ are independently selected from the group consisting of hydrogen and alkyl;

n is 2 or 3;

x is 0 or 1;

Y is selected from the group consisting of O and $NR_9$, wherein:

$R_9$ is selected from the group consisting of hydrogen and alkyl; and

X is selected from the group consisting of $OR_{10}$ and G, wherein:

$R_{10}$ is selected from the group consisting of hydrogen and alkyl; and

G is $$\underset{H}{N}{\left(\underset{H}{\overset{R_8}{\underset{|}{C}}}\right)_n}Y'{\left(\underset{H}{\overset{R_7}{\underset{|}{C}}}\right)_n}_x \underset{R_6}{\overset{R_5}{N}}$$

wherein:

$R_5$ and $R_6$ are independently selected alkyl groups or can be taken together to form a five or six-membered heterocyclic ring;

$R_7$ and $R_8$ are independently selected from the group consisting of hydrogen and alkyl;

n is 2 or 3;

x is 0 or 1; and

Y' is selected from the group consisting of O and $NR_{11}$, wherein $R_{11}$, is selected from the group consisting of hydrogen and alkyl.

In the above structural formulae, $R_1$, $R_2$, $R_5$, and $R_6$ can be the same or different and, in one embodiment, are alkyl, preferably lower alkyl of from one to four carbon atoms, such as, methyl, ethyl, propyl, isopropyl, butyl, isobutyl, sec-butyl, and tert-butyl. Alternatively, $R_1$ and $R_2$ can be taken together to form a heterocyclic ring of five or six members, such as pyrroles, pyrrolines, pyrrolidines, pyrazoles, imidazoles, triazoles, dioxazoles, oxathiazoles, piperazines, isoxazines, morpholines, and the like. Imidazoles and morpholines are preferred. Similarly, where $R_5$ and R6 are present, they can also be taken together to form a heterocyclic ring of five or six members, which can be of the kind described above and which can be the same as, or different from, a ring formed from $R_1$ and $R_2$.

Where $R_1$ and $R_2$ are alkyl, it is preferred that they be the same. It is also preferred that when $R_5$ and $R_6$ are present and are alkyl they be the same. It is most preferred that when $R_1$, $R_2$, $R_5$, and $R_6$ are all present, they all be the same, whether they be alkyl or heterocyclic rings.

$R_3$, $R_4$, $R_7$, and $R_8$ in the above structural formulae are independently selected from the group consisting of hydrogen and alkyl. When any of $R_3$, $R_4$, $R_7$, or $R_8$ is alkyl, it is preferred that it be lower alkyl of from one to four carbon atoms, such as methyl, ethyl, propyl, isopropyl, butyl, isobutyl, sec-butyl, and tert-butyl. It is preferred that $R_3$ and $R_4$, $R_7$, and $R_8$, when present, be the same and that they be hydrogen or methyl.

Y is oxygen or $NR_9$ where $R_9$ is hydrogen or alkyl. Where $R_9$ is alkyl, it is preferably lower alkyl of from one to four carbon atoms as described above. Y' can be the same or different from Y and similarly is oxygen or $NR_{11}$ where $R_{11}$ is hydrogen or alkyl. Where $R_{11}$ is alkyl, it is preferably lower alkyl of from one to four carbon atoms as described above.

X can be either $OR_{10}$ or G, where $R_{10}$ can be hydrogen or alkyl. Where $R_{10}$ is alkyl, it is preferably lower alkyl of from one to four carbon atoms as described above. It is preferred that X be G.

The alkylamino oxamides employed in the practice of the present invention are derived from the condensation of primary N,N-(dialkylaminoalkyl)amines (or mixtures of primary N,N-(dialkylaminoalkyl)amines) with oxalate esters (or oxalic acid). There is thus provided a class of catalysts containing active hydrogen groups that have unique utility as low odor, non-fugitive catalysts for the preparation of polyurethanes. The use of these catalysts permits the preparation of urethane foams having improved physical properties relative to those obtained using conventional amine catalysts.

These alkylamino oxamides, themselves, while not new compositions, have not previously been employed as polyurethane catalysts. They have low odor and are non-fugitive in typical foams. While not wishing to be held to any theory of mechanism, the inventors believe that the alkylamino oxamides are non-fugitive because they have the potential to react with isocyanates (through the oxamide N—H group) and/or because they have relatively high molecular weight and polarity.

In addition, the inventors have found that mixtures of these alkylamino oxamides with one or more hydroxy carboxylic acids are also good catalysts, producing urethane foams with unexpectedly good physical properties. Hydroxy acids that can be employed in combination with the alkylamino oxamides in the practice of the present invention include, but are not limited to, salicylic acid, gluconic acid, dimethylol propionic acid, chloroacetic acid, m-hydroxybenzoic acid, p-hydroxybenzoic acid, gallic acid, syringic acid, tartaric acid, citric acid, 2-hydroxymethylpropionic acid, dihydroxybenzoic acid, glycolic acid, beta.-hydroxybutyric acid, cresotic acid, 3-hydroxy-2-naphthoic acid, lactic acid, malic acid, resorcylic acid, hydroferulic acid and the like. Salicylic acid is preferred. Lactones (cyclic esters) wherein a hydroxyl group and a carboxyl group on the same molecule of the above formula react with one another to form a hydroxy acid suitable for practicing the present invention also can be used. Such lactones include gamma-butyrolactone. Hydroxy acids useful in the practice of the present invention generally have molecular weights below about 250.

Thus the alkylamino oxamides employed in the practice of the present invention are unique as catalysts for polyurethanes in at least three different ways:

1. U.S. Pat. No. 4,348,536 cites earlier patents that suggest that polyurethane catalysts containing active hydrogen groups are not effective because they are "gradually built into the polymer structure" and consequently are no longer available to help finish the cure of the polymer (especially polyurethane foams). The compounds of the present invention are alkylamino oxamides in which the amide groups are secondary, not tertiary, derivatives, i.e., they contain active hydrogen groups. The reactivity studies provided in the Examples below confirm that it is always possible to define a use level of alkylamino oxamide that will give a reactivity profile reasonably close to that of a given control catalyst.

2. It has also been found that the catalysts that result from mixing these alkylamino oxamides with hydroxy carboxylic acids are particularly effective products. They provide polyurethane foams with good cure characteristics (long exit time, same de-mold time) and unexpectedly improved physical properties when compared to those prepared with conventional amine catalysts.

3. These new polyurethane catalysts are non-fugitive.

The alkylamino oxamides can catalyze the reaction between an isocyanate functionality and an active hydrogen-containing compound, i.e. an alcohol, a polyol, an amine or water with isocyanate to make polyurethanes and the blowing reaction of water with isocyanate to release carbon dioxide for making foamed polyurethanes.

The polyurethane products are prepared using any suitable organic polyisocyanates well known in the art including, for example, hexamethylene diisocyanate, phenylene diisocyanate, toluene diisocyanate ("TDI") and 4,4'-diphenylmethane diisocyanate ("MDI"). Especially suitable are the 2,4- and 2,6-TDI's individually or together as their commercially available mixtures. Other suitable isocyanates are mixtures of diisocyanates known commercially as "crude MDI", also known as PAPI, which contain about 60% of 4,4'-diphenylmethane diisocyanate along with other isomeric and analogous higher polyisocyanates. Also suitable are "prepolymers" of these polyisocyanates comprising a partially prereacted mixture of a polyisocyanate and a polyether or polyester polyol.

The catalysts of the present invention can be used in mixtures with other catalysts, surfactants, or other additives or polyurethane components as are known in the art.

Foam formulations with which the alkylamino oxamides can be used as catalysts usually comprise (a) a polyether polyol containing an average of more than two hydroxyl groups per molecule; (b) an organic polyisocyanate; (c) at least one catalyst for production of polyurethane foam; (d) water; (e) a surfactant, preferably any of the silicone/polyether copolymers known in this field for this purpose; and (f) an inert gas.

The polyols have an average number of hydroxyl groups per molecule of at least slightly above 2 and typically 2.1 to 3.5. Generally, the polyol should have an equivalent weight of about 400 to 1500 or even 400 to 3000 grams/equivalent and an ethylene oxide content of less than 20%. Useful polyols include, but are not limited to, polyether polyols such as alkylene oxide adducts of polyhydroxyalkanes, alkylene oxide adducts of non-reducing sugars and sugar derivatives, alkylene oxide adducts of polyphenols, and alkylene oxide adducts of polyamines and polyhydroxyamines. The alkylene oxides are preferably based on ethylene oxide or propylene oxide.

The water generally comprises on the order of 1 to 12 php (parts by weight per hundred parts of polyol).

Other additives may be added to the polyurethane foam to impart specific properties to the foam, including, but not limited to, coloring agents, flame retardants, and GEOLITE® Modifier foam additives (available from Organo Silicones Group of Crompton Corporation). The inert gas is one which is soluble in the foam formulation at elevated pressures, but will come out of solution (i.e., blow) at atmospheric pressure. An exemplary such gas is $CO_2$, but nitrogen, air, or other common gases, including hydrocarbon gases, such as methane and ethane may also be used. The inert gas may also comprise a volatile organic compound such as a pentane isomer or a hydrochlorocarbon that boils above ambient temperature, but has a sufficiently high vapor pressure at ambient temperature that its vapor represents a substantial component of the gas in the cells of the foam.

The silicone copolymer surfactants should be capable of helping to form a stable foam and should be present in an amount effective to stabilize the polyurethane foam, i.e., an amount which is generally about 0.05 to 5 wt. percent of the total reaction mixture, preferably 0.2 to 1.5 wt. percent.

The foam is manufactured by mixing the ingredients together such that byproduct gas generated during the reaction foams the polyurethane. The foam can also be made by the injection of inert gas, whereby the reactants are put under high pressure (i.e., at least greater than atmospheric pressures) so that the inert gas is dissolved in the reactant mixture. Then the mixture is flashed, by releasing the pressure, which causes the gas to form bubbles at nucleation sites in the foaming system and thus act as a blowing agent. This produces a reduced density foam. For a more complete description of this process and the equipment required therein, see European Patent Publication No. 0 645 226 A2, which is incorporated herein by reference.

The compounds of the present invention may also be used as catalysts in non-foam polyurethane reactions, such as polyurethane elastomer formation. In such polyurethanes, the water in the formulation is often replaced with a chain extender, which is a low molecular weight (<400) active hydrogen containing compound with at least two reactive groups. Examples are 1,4-butanediol, ethylene glycol, diethylene glycol and ethylene diamine.

The conditions and formulations for these reactions are known in the art, e.g., "Polyurethane Handbook," 2nd ed., Gunter Ortel, ed., Hanser Publishers, Cincinnati, 1994, which is incorporated herein by reference.

Various features and aspects of the present invention are illustrated further in the examples that follow. While these examples are presented to show one skilled in the art how to operate within the scope of the invention, they are not intended in any way to serve as a limitation upon the scope of the invention.

EXAMPLES

A total of nine alkylamino oxamate catalysts were synthesized from diethyl oxalate and various N,N-(dialkylaminoalkyl)amines (or mixtures of amines) using the following procedure.

A 500 mL four-neck flask equipped with a thermometer, stirrer, condenser, pressure equalizing addition funnel, and heating mantle was used for all syntheses. The system was held under a nitrogen blanket. A calculated amount of diethyl oxalate was weighed into the flask and a calculated amount of primary amine (or primary amine mixture) placed in the addition funnel (ratio, one mole of oxalate to two moles of amine). The amine was fed slowly (6 mL/min) into the flask while the mixture was being stirred and the temperature was being monitored. Once all of the amine was added, the system was heated to a temperature equal to the melting point for the compound and held for about an hour with stirring. After being allowed to cool, the crystals were collected via filtration (to remove the ethanol condensation product). Melting point was determined (see reference; Swiss Pat. No. 483461) and each product was analyzed using $^{13}C$ NMR to verify its structure.

Example 1

Bis{N-(N',N'-Dimethylaminopropyl)}oxamide

A total of 104.3 grams (0.71 mole) of diethyl oxalate was weighed into the kettle. 145.7 grams (1.42 moles) of 3-(dimethylamino)propylamine (DMAPA) was weighed into the addition funnel. The DMAPA was slowly added (6 mL/min) to the kettle while the mixture was being stirred and the temperature was being monitored. During the addition of the DMAPA the temperature increased from an initial temperature of 24° C. to a final temperature of 104° C. where it was held for several hours. The solution was then crystallized and filtered under vacuum to remove remaining ethanol. The melting point of the solid was 95–97° C., which is consistent with the published value of 100–101° C. $^{13}C$ NMR indicated the desired structure was obtained and the structure is as follows:

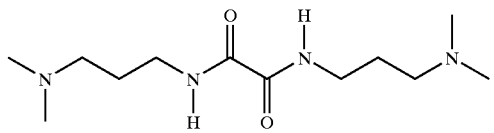

Example 1A

Bis{N-(N',N'-dimethylaminopropyl)}oxamide from Example 1, 50 grams, was added to 50 grams of water and stirred until all the solid dissolved. To this stirred solution was added 13.37 grams of salicylic acid to form an aqueous catalyst mixture.

Example 2

Bis{N-(N',N'-Dimethylaminoethyl)}oxamide

A total of 68.7 grams (0.47 mole) of 99% pure diethyl oxalate was weighed into the kettle. 86.1 grams (0.94 mole) of 95% pure diethylaminoethylamine (DMAEA) was weighed into the addition funnel. The DMAEA was slowly added (6 mL/min) to the kettle while the mixture was being stirred and the temperature was being monitored. During the addition of the DMAEA the temperature increased from an initial temperature of 24° C. to a final temperature of 95° C. where it was held for several hours. The solution was then crystallized and filtered under vacuum to remove remaining ethanol. The melting point of the solid was 120–122° C., which is consistent with the published value of 122–123° C. $^{13}$C NMk indicated the desired structure was obtained and the structure is as follows:

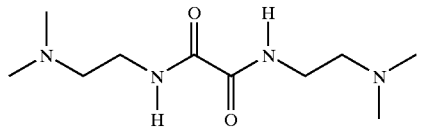

Example 3

Bis{N-(3-Imidazolidinylpropyl)}oxamide

A total of 94.7 grams (0.38 mole) of 99% pure diethyl oxalate was weighed into the kettle. 55.2 grams (0.76 mole) of 98% pure 1-(3-aminopropyl)imidizole was weighed into the addition funnel. The 1-(3-aminopropyl)imidizole was slowly added (6 mL/min) to the kettle while the mixture was being stirred and the temperature was being monitored. During the addition of the 1-(3-aminopropyl)imidizole the temperature increased from an initial temperature of 24° C. to a final temperature of 100° C. where it was held for several hours. The solution was then crystallized and filtered under vacuum to remove remaining ethanol. The melting point of the solid was 174–176° C. $^{13}$C NMR indicates the desired structure was obtained and the structure is as follows:

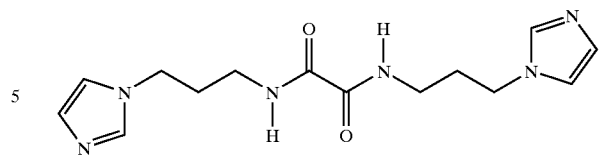

Example 4

Bis{N-(N',N'-diethylaminoethyl)}oxamide

A total of 57.8 grams (0.40 mole) of 99% pure diethyl oxalate was weighed into the kettle. 99.1 grams (0.80 mole) of 99% pure N,N-diethylamino-ethylamine (DEAEA) was weighed into the addition funnel. The DEAEA was slowly added (6 mL/min) to the kettle while the mixture was being stirred and the temperature was being monitored. During the addition of the DEAEA the temperature increased from an initial temperature of 24° C. to a final temperature of 89° C. where it was held for several hours. The solution was then crystallized and filtered under vacuum to remove remaining ethanol. The melting point of the solid was 38–40° C., which is consistent with the published value of 41–43° C. $^{13}$C NMR indicates the desired structure was obtained and the structure is as follows:

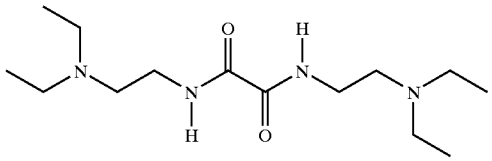

Example 5

Bis{N-(N',N'-Diethylaminopropyl)}oxamide

A total of 54.7 grams (0.37 mole) of 99% pure diethyl oxalate was weighed into the kettle. 97.0 grams (0.74 mole) of 99% pure N,N-diethylaminopropylamine (DEAPA) was weighed into the addition funnel. The DEAPA was slowly added (6 mL/min) to the kettle while the mixture was being stirred and the temperature was being monitored. During the addition of the DEAPA the temperature increased from an initial temperature of 24° C. to a final temperature of 97° C. where it was held for several hours. The solution was then crystallized and filtered under vacuum to remove remaining ethanol. The melting point of the solid was 48–49° C., which is consistent with the published value of 48–49° C. $^{13}$C NMR indicates the desired structure was obtained and the structure is as follows:

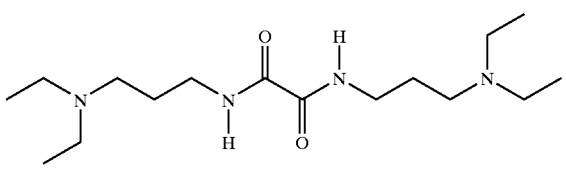

Example 6

Bis{N-(N',N'-Dibutylaminopropyl)}oxamide

A total of 35.6 grams (0.24 mole) of 99% pure diethyl oxalate was weighed into the kettle. 90.7 g (0.48 m) of 99% pure N,N-dibutylaminopropylamine (DBAPA) was weighed into the addition funnel. The DBAPA was slowly added (6 mL/min) to the kettle while the mixture was being stirred and the temperature was being monitored. During the addition of the DBAPA the temperature increased from an initial temperature of 24° C. to a final temperature of 78° C. where it was held for several hours. The solution was then crystallized and filtered under vacuum to remove remaining ethanol. The melting point of the solid was 44–46° C., which is consistent with the published value of 50–51° C. $^{13}$C NMR indicates the desired structure was obtained and the structure is as follows:

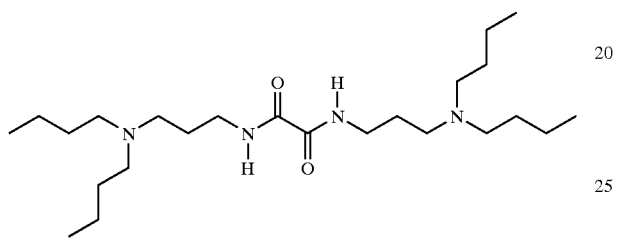

Example 7

Bis{N-(N',N'-Diethylimino-1-methylpropyl)}oxamide

A total of 39.9 grams (0.27 mole) of 99% pure diethyl oxalate was weighed into the kettle. 88.1 grams (0.54 mole) of 97% pure 2-amino-5-diethylaminopropane was weighed into the addition funnel. The 2-amino-5-diethylaminopropane was slowly added (6 mL/min) to the kettle while the mixture was being stirred and the temperature was being monitored. During the addition of the 2-amino-5-diethylaminopropane the temperature increased from an initial temperature of 24° C. to a final temperature of 73° C. where it was held for several hours. The solution was then crystallized and filtered under vacuum to remove remaining ethanol. The melting point of the solid was 50–52° C., which is consistent with the published value of 52–53° C. $^{13}$C NMR indicates the desired structure was obtained and the structure is as follows:

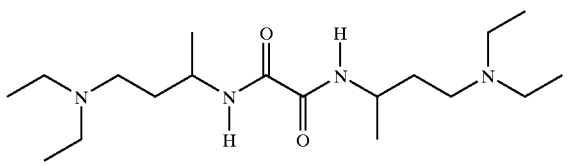

Example 8

Bis{N-(3-Morpholinopropyl)}oxamide

A total of 42.5 grams (0.29 mole) of 99% pure diethyl oxalate was weighed into the kettle. 84.6 grams (0.58 mole) of 98% pure 4-(3-aminopropyl)morpholine was weighed into the addition funnel. The 4-(3-aminopropyl)morpholine was slowly added (6 mL/min) to the kettle while the mixture was being stirred and the temperature was being monitored. During the addition of the of 4-(3-aminopropyl)morpholine the temperature increased from an initial temperature of 24° C. to a final temperature of 89° C. where it was held for several hours. The solution was then crystallized and filtered under vacuum to remove remaining ethanol. The melting point of the solid was 121–123° C., which is consistent with the published value of 125–126° C. $^{13}$C NMR indicates the desired structure was obtained and the structure is as follows:

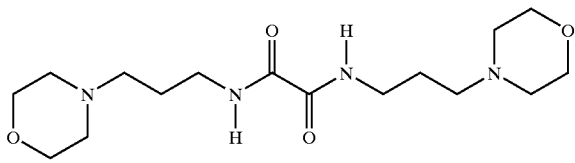

Example 8a

Mixed Catalyst System

Bis{N-(3-Morpholinopropyl)}oxamide/Bis{N-(N',N'-dimethylaminopropyl)}oxamide A total of 73.82 grams (0.50 mole) of 99% pure diethyl oxalate was weighed into the kettle. 73.60 grams (0.50 mole) of 98% pure 4-(3-aminopropyl)morpholine was weighed into the addition funnel along with 51.62 grams (0.50 mole) of 99% pure 3-(dimethylamino)propylamine. The amine mixture was slowly added (6 mL/min) to the kettle while the mixture was being stirred and the temperature was being monitored. During the addition the temperature increased from an initial temperature of 24° C. to a final temperature of 80.5° C. where it was held for several hours. The solution was then crystallized and filtered under vacuum to remove remaining ethanol. The melting point of the solid was 62–72° C. One gram of water was added to one gram of the product. The product was soluble in water at this concentration.

Glossary

Polyol 1 is Arcol® Polyol E-656, a commercial product from Lyondell.
Polyol 2 is Arcol Polyol E-688, a commercial product from Lyondell.
Polyol 3 is Multranol® 7057, a commercial product from Bayer.
Polyol 4 is Voranol® 360, a commercial polyol from The Dow Chemical Company.
Polyol 5 is PS 3152, a commercial polyol from Stephan Chemical.
Polyol 6 is Arcol Polyol 11-34, a commercial product from Lyondell.
Polyol 7 is Arcol Polyol LHT-240, a commercial product from Lyondell.
Polyol 8 is Arcol Polyol E-785, a commercial product from Lyondell.
Polyol 9 is Arcol Polyol 2580, a commercial product from Lyondell.
Polyol 10 is Specflex® NC-700, a commercial product from The Dow Chemical Company.
Polyol 10 is Specflex NC-630, a commercial product from The Dow Chemical Company.
Stabilizer 1 is diethanolamine, low-freezing grade (DEOA LF).
Catalyst 1 is Niax® Catalyst A-1, a commercial product from Crompton Corporation.
Catalyst 2 is Niax Catalyst A-33, a commercial product from Crompton Corporation.

Catalyst 3 is stannous octoate.
Catalyst 4 is Niax Catalyst A-200, a commercial product from Crompton Corporation.
Catalyst 5 is 33% A-1, 33% A-33, 33% POLYCAT-15.
Silicone Surfactant 1 is Niax® Silicone Y-10366, a commercial product from Crompton Corporation.
Silicone Surfactant 2 is Niax Silicone L-580, a commercial product from Crompton Corporation.
Silicone Surfactant 3 is Niax Silicone Y-10660, a commercial product from Crompton Corporation.
Silicone Surfactant 4 is Niax Silicone L-3001, a commercial product from Crompton Corporation.
Isocyanate 1 is Mondur® TD-80, a commercial product from Bayer.
Isocyanate 2 is Rubinate® 7302, a commercial product from Huntsman.
Isocyanate 3 is Mondur® MR, a commercial product from Bayer.
Cream time is the first visible movement of the foam mixture after mixing all components.
Top of cup time is the time for the foaming mixture to reach the top of the polymerization container.
String gel time (s & g) is the time when the polymer has enough integrity to form a "string" when the surface is touched with a wooden spatula and the spatula is pulled away rapidly.
Blow time is the time when evolution of $CO_2$ from the surface of the foam is detected.
Tack free time is the time when the surface of the foam is no longer "sticky" to the touch.
Exit time is the time when the foaming mixture exits the vents in the mold.
Vents are holes in the top of the mold to allow air to escape.
De-mold time is the time when the mold is opened and the foam pad removed.
Pad weight is the final weight of the fabricated foam pad.
Test Methods, Urethane Foam Physical Properties
ASTM D 3574
Evaluation of Fugitivity
Method: Headspace Gas Chromatography (HS-GC) using a Perkin Elmer Autosystem LX GC and an HS 40 Headspace Sampler. Samples placed in test vials in the instrument.
Headspace Conditions:
Samples were heated for 30 minutes at 150° C. prior to injecting onto the GC.
Needle temp.—150° C.
Transfer temp.—180° C.
Pressurization time—3 min.
Injection time—0.15 min.
Withdrawal time—0.2 min.
GC Conditions:
The GC injector was set at 250° C. to ensure complete vaporization.
A Supelco column, SPB1, with dimensions of 30 m×0.53 mm ID with a 1 μm film was used in the separation.
The flow rate is 1 mL/min of helium.
The column was heated at a temperature program starting at 50° C., which was held for 5 minutes and then ramped 10° C./minute to 220° C. The temperature was held at 220° C. for 10 minutes for a total run time of 32 minutes.
A flame ionization detector set at 300° C. was used.
Results:
Analysis of neat catalysts:
Bis-(dimethylaminoethyl)ether and 1,4-diazabicyclo[2.2.2.]octane (control catalysts) both readily volatilize and were identified using this method.
The reaction product of diethyl oxalate and DMAPA (Example 1) was found to contain diethyl oxalate and ethanol, but no peak indicative of the high molecular weight oxamide adduct, i.e., it was not volatile.
Analysis of foam samples containing catalyst:
Foam samples (duplicates of the foams identified in Examples 40 through 43, infra) contained trace volatile components, but no detectable amount of the oxamide adduct.
Conclusion:
The DMAPA oxamide adduct is non-volatile under the above conditions.

Reactivity Studies

Examples 9 through 21

Molded Foams

The first application in which these catalysts were evaluated was molded foam for automotive seating. A control formulation was defined containing 50 parts each of Polyol 1 and Polyol 2, 1.5 parts Stabilizer 1, 1.2 parts Silicone Surfactant 1, 3.5 parts water, 0.125 part (0.0011 amine equivalent) of Catalyst 1, 0.25 part (0.0015 amine equivalent) of Catalyst 2, and Isocyanate 1 at 105 Index. Then, a series of foams was made using 0.0015 amine equivalent of each of three oxamide/amine catalysts (Examples 1 and 4, each dissolved in the water used in the formulation, and Example 7 dissolved in dipropylene glycol (DPG), 50%) as the only catalyst in the formulation. Another series of foams was made using 0.0011 amine equivalent of Catalyst 1, but replacing Catalyst 2 with an equal amine equivalent (0.0015), two times the amine equivalent (0.0030) and three times the amine equivalent (0.0045) of each of the three oxamidelamine catalysts from Examples 1, 4, and 7. All foams were compared by measuring the cream, top-of-cup (toc), and string and gel (s&g) times. Results are shown in Table I below:

TABLE I

Evaluation in Molded Foam Formulation, Reactivity

| Example # | 9 | 10 | 11 | 12 | 13 | 14 | 15 | 16 | 17 | 18 | 19 | 20 | 21 |
| --- | --- | --- | --- | --- | --- | --- | --- | --- | --- | --- | --- | --- | --- |
| Use level | | 1x[b] | 1x | 2x | 3x | 1x[b] | 1x | 2x | 3x | 1x[b] | 1x | 2x | 3x |
| Cat 1[c] | 0.0011 | 0 | 0.0011 | 0.0011 | 0.0011 | 0 | 0.0011 | 0.0011 | 0.0011 | 0 | 0.0011 | 0.0011 | 0.0011 |
| Cat 2[c] | 0.0015 | 0 | 0 | 0 | 0 | 0 | 0 | 0 | 0 | 0 | 0 | 0 | 0 |
| Equiv. Example 1[c] | 0 | 0.0015 | 0.0015 | 0.0029 | 0.0044 | 0 | 0 | 0 | 0 | 0 | 0 | 0 | 0 |
| Equiv. Example 4[c] | 0 | 0 | 0 | 0 | 0 | 0.0015 | 0.0015 | 0.0029 | 0.0045 | 0 | 0 | 0 | 0 |
| Equiv. Example 7[c] | 0 | 0 | 0 | 0 | 0 | 0 | 0 | 0 | 0 | 0.0015 | 0.0015 | 0.0029 | 0.0044 |

TABLE I-continued

Evaluation in Molded Foam Formulation, Reactivity

| Example # | 9 | 10 | 11 | 12 | 13 | 14 | 15 | 16 | 17 | 18 | 19 | 20 | 21 |
|---|---|---|---|---|---|---|---|---|---|---|---|---|---|
| Use level | | 1x[b] | 1x | 2x | 3x | 1x[b] | 1x | 2x | 3x | 1x[b] | 1x | 2x | 3x |
| cream (sec) | 10 | 18 | 7 | 8 | too fast[d] | 12 | 9 | 6.5 | too fast | too fast | too fast | too fast | too fast |
| top-of-cup (sec) | 32.5 | 138 | 54 | 40 | 28 | N/A | 60.5 | 42 | 31 | 128 | 28 | 21 | too fast |
| s&g (sec) | 63 | 147 | 95 | 86 | 58 | N/A | 112 | 84 | 60 | 152 | 77 | 53 | too fast |

[b]These foams were made using only the oxamide/amine catalysts.
[c]"ameq" represents amine equivalents.
[d]"too fast" indicates that this value could not be measured because the system was too fast.
[e]"n/a" indicates that this value could not be measured because the system was too slow to give value within reasonable time limit.

Reactivity Studies

Examples 22 through 31

Flexible Slabstock Foams

The next application area in which these catalysts were evaluated was flexible slabstock foams. These foams were made in a 14×14×6 inch cardboard cake box while monitoring the rise and temperature profiles. A control formulation contained 100 parts Polyol 3, 3.5 parts water, 0.2 part Catalyst 3, 1 part Silicone Surfactant 2, 0.2 part of Catalyst 4 and Isocyanate 1 at 1 10 index. A series of foams was made replacing Catalyst 4 with two, four and six times the total amine equivalents of the oxamide amine catalysts dissolved in the water used in the formulation. (Example 7 was evaluated at one, two, and three times the amine equivalents because the solution was diluted 50% in DPG and the DPG was not accounted for in the calculations initially). These foams were compared to the control in terms of cream, blow, rise and temperature profiles, airflow, IFD, density and 90% compression sets. Results are shown in Table II below:

TABLE II

Evaluation in Flexible Slabstock Foam Formulation, Reactivity

| Example # | 22 | 23 | 24 | 25 | 26 | 27 | 28 | 29 | 30 | 31 |
|---|---|---|---|---|---|---|---|---|---|---|
| Catalyst | Cat 4 | Ex 1 | Ex 1 | Ex 1 | Ex 4 | Ex 4 | Ex 4 | Ex 7 | Ex 7 | Ex 7 |
| Use level | | 2x | 4x | 6x | 2x | 4x | 6x | 1x | 2x | 3x |
| parts | 0.2 | 0.298 | 0.596 | 0.894 | 0.332 | 0.664 | 0.996 | 0.43 | 0.86 | 1.29 |
| amine eq | 0.001 | 0.002 | 0.004 | 0.006 | 0.002 | 0.004 | 0.006 | 0.002 | 0.004 | 0.006 |
| cream (sec) | 10 | 8 | 6 | 6 | 13 | 10 | 10 | 18 | 17 | 14 |
| blow (sec) | 97 | 101 | 89 | 79 | none | 122 | 114 | 116 | 106 | 98 |
| max. temp (° C.) | 147.1 | 145.5 | 145.4 | 146.9 | 141.4 | 142 | 141.8 | 144.5 | 146.2 | 146.1 |
| max. rise, cm | 17.56 | 18.58 | 17.34 | 17.35 | 17.33 | 16.72 | 17.14 | 18.38 | 17.96 | 17.55 |
| final rise, cm | 17.13 | 18.37 | 16.51 | 16.51 | 17.13 | 16.09 | 16.93 | 18.15 | 17.13 | 16.7 |
| top collapse | 0.43 | 0.21 | 0.83 | 0.84 | 0.2 | 0.63 | 0.21 | 0.23 | 0.83 | 0.84 |
| % settle | 2.4 | 1.1 | 4.8 | 4.8 | 1.2 | 3.8 | 1.2 | 1.2 | 4.6 | 4.8 |

Reactivity Studies

Examples 32 through 36

Rigid Foam

The oxamide amine catalyst synthesized from diethyl oxalate and dimethylaminopropylamine (Example 1) was also evaluated in a rigid foam formulation. The control formulation contained 50 parts of Polyol 4, 25 parts of Polyol 5, 10 parts of Polyol 6, 15 parts of Polyol 7, 5.5 parts of water, 2 parts of Silicone Surfactant 3, and 0.66 part of Catalyst 1. The isocyanate was Isocyanate 3, used at an index of 110. Catalyst 1 was replaced with two, three, six, and eight times the parts of oxamide amine from Example 1 (dissolved in the water used in the formulation). The foams made with the oxamide amine catalysts were compared to the control foam in terms of the cream, string and gel (s&g), tack free and full rise times. The results are shown in Table III below:

TABLE III

Evaluation in Rigid Foam Formulation, Reactivity

| Example # | 32 | 33 | 34 | 35 | 36 |
|---|---|---|---|---|---|
| Catalyst | Cat 1 | Example 1 | Example 1 | Example 1 | Example 1 |
| Use Level | Control | 2x | 3x | 6x | 8x |
| Parts | 0.66 | 1.32 | 1.98 | 3.96 | 5.28 |
| Amine eq. | 0.008 | 0.010 | 0.016 | 0.031 | 0.041 |
| Cream, sec | 8.52 | 57.07 | 26.33 | 16.48 | 13.34 |
| S&g, sec | 70.55 | 208.9 | 93.48 | 52.93 | 42.8 |
| Tack free sec | 134.61 | 329.46 | 164.84 | 98.08 | 69.56 |
| full rise, sec | 173.25 | 340.52 | 174.52 | 107.78 | 79.38 |

As the data in Tables I, II, and III show, the alkylamino oxamides are good catalysts provided an effective amount of each is used to catalyze the system. In all cases, it was possible to obtain reactivity profiles similar to that of a typical control catalyst mixture.

Reactivity and Foam Physical Properties Studies

Examples 37 through 45

Molded Foam Examples, MDI Type Isocyanate

The data in Table IV allows a comparison of the performance of a typical control catalyst (Catalyst 5) against an alkylamino oxamide (Example 1) and its aqueous admixture with salicylic acid (Example 1A). At the use levels studied, it is clear that the reactivities of the foams in Examples 40 through 45 are slower than the control. This is particularly true when the catalyst of Example 1A was used. Note, however, that the increased exit time did not negatively affect the de-mold time of the foam. In fact, the long exit time is indicative of a useful delayed action quality with this unique amine mixture. Note also that the catalysts of Example 1 and Example 1A produced molded foams with unexpectedly good physical properties compared to Catalyst 5. These foams have higher resiliency, higher air flow (implying more open cell content), higher load bearing properties (50 and 65% IFD), and lower (better) set properties than the foam made using Catalyst 5. Significantly, the other physical properties are not negatively affected when either the alkylamino oxamide or the salicylic acid mixture is used as the catalyst.

bination. The foams from Examples 52, 53, and 54 have higher air flow (implying more open cell content), higher loads (25, 50, and 65% IFD and 50% CFD), and higher tensile, tear, and elongation properties than the foam made using the Catalyst 1/Catalyst 2 controls. Significantly, the other physical properties (possible exception, 75% humid age compression sets (HACS), see ASTM D 3574) are not negatively affected when either the alkylamino oxamide or its mixture with salicylic acid is used as the catalyst. In fact, the addition of salicylic acid not only provides cell opening (as evidenced by the higher airflow) and improved load bearing properties (as evidenced by the IFD values), but also lowers (betters) the 75% compression set and the 75% HACS values relative to the catalyst of Example 1. Of course, it should be understood that the cell opening effect

TABLE IV

Molded Foam Evaluation, Reactivity and Physical Properties

| Example # | 37 | 38 | 39 | 40 | 41 | 42 | 43 | 44 | 45 |
|---|---|---|---|---|---|---|---|---|---|
| Polyol 8 | 100 | 100 | 100 | 100 | 100 | 100 | 100 | 100 | 100 |
| Polyol 9 | 1.30 | 1.30 | 1.30 | 1.30 | 1.30 | 1.30 | 1.30 | 1.30 | 1.30 |
| water total | 3.55 | 3.55 | 3.55 | 3.55 | 3.55 | 3.55 | 3.55 | 3.55 | 3.55 |
| water added | 3.45 | 3.45 | 3.45 | 1.651 | 1.651 | 1.651 | 1.691 | 1.691 | 1.691 |
| Stabilizer 1 | 0.66 | 0.66 | 0.66 | 0.66 | 0.66 | 0.66 | 0.66 | 0.66 | 0.66 |
| Catalyst 5 | 0.61 | 0.61 | 0.61 | | | | | | |
| Example 1 (50% in water) | | | | 3.60 | 3.60 | 3.60 | | | |
| Example 1A | | | | | | | 4.00 | 4.00 | 4.00 |
| Silicone Surf. 4 | 1.5 | 1.5 | 1.5 | 1.5 | 1.5 | 1.5 | 1.5 | 1.5 | 1.5 |
| Isocyanate 2, g | 55.29 | 55.29 | 55.29 | 55.31 | 55.31 | 55.31 | 55.30 | 55.30 | 55.30 |
| Index | 80 | 80 | 80 | 80 | 80 | 80 | 80 | 80 | 80 |
| Batch Size, g | 600 | 600 | 600 | 600 | 600 | 600 | 600 | 600 | 600 |
| Room Temp, ° F. | 72 | 72 | 72 | 72 | 72 | 72 | 72 | 72 | 72 |
| Cream Time, sec. | 5 | 5 | 5 | 10 | 10 | 10 | 11 | 11 | 11 |
| Exit Time, sec. | 44 | 44 | 45 | 75 | 75 | 74 | 82 | 83 | 82 |
| Mold Temp, ° F. | 150 | 150 | 150 | 150 | 150 | 150 | 150 | 150 | 150 |
| Demold Time, min | 5 | 5 | 5 | 5 | 5 | 5 | 5 | 5 | 5 |
| Vent, inches | 1/16 | 1/16 | 1/16 | 1/16 | 1/16 | 1/16 | 1/16 | 1/16 | 1/16 |
| Pad Wt, g | 785 | 792 | 795 | 792 | 788 | 792 | 800 | 800 | 800 |

| | Density, pcf | Resiliency | Air Flow | IFD Thick | 25% IFD | 50% IFD | 65% IFD | 50/25 ratio | 65/25 ratio | 50% CFD | Tensile, psi | Elongation % | Tear, pli | 75% Comp set, % | 50% HALL, % | 75% HACS, % | Wet Set, % |
|---|---|---|---|---|---|---|---|---|---|---|---|---|---|---|---|---|---|
| Catalyst 5 | | | | | | | | | | | | | | | | | |
| Avg. 37,38,39 | 2.98 | 54 | 2.29 | 3.85 | 24.55 | 43.15 | 66.38 | 1.76 | 2.70 | 0.25 | 10.32 | 116.51 | 0.98 | 7.78 | 10.83 | 6.69 | 6.92 |
| Example 1 | | | | | | | | | | | | | | | | | |
| Avg. 40,41,42 | 2.97 | 62 | 3.19 | 3.85 | 24.65 | 44.85 | 69.86 | 1.82 | 2.83 | 0.26 | 10.36 | 109.15 | 0.99 | 6.70 | 14.25 | 6.14 | 6.49 |
| Example 1A | | | | | | | | | | | | | | | | | |
| Avg. 43,44,45 | 3.07 | 62 | 3.97 | 3.86 | 24.45 | 46.20 | 73.23 | 1.89 | 3.00 | 0.27 | 10.60 | 110.52 | 0.89 | 6.08 | 14.83 | 6.03 | 5.24 |

Reactivity and Foam Physical Properties Studies

Examples 46 through 54

Molded Foam Examples, TDI Isocyanate

The data in Table V show a comparison of the performance of a typical catalyst package (Catalysts 1 and 2) against an alkylamino oxamide (Example 1) and its aqueous admixture with salicylic acid (Example 1A). At the use levels studied, it is clear that the reactivities of the foams in Examples 50 through 55 are slightly slower than the control. The differences are not as large as those noted in previous examples, and the de-mold time of the foam was not affected. Note also that these catalysts (particularly Example 1A) produced molded foam with exceptionally good physical properties compared to the Catalyst 1/Catalyst 2 comis a function of the amount of acid present, and that the amount of salicylic acid cited in Example 1 is for illustrative purposes only. More acid will provide more cell-opening and in the limit, foam collapse. However, the amount of acid can be adjusted so that the right amount of acid is present to provide the needed degree of cell opening depending on the inherent degree of tightness of the formulation.

TABLE V

Molded Foam Evaluation, Reactivity and Physical Properties

| Example # | 46 | 47 | 48 | 49 | 50 | 51 | 52 | 53 | 54 |
|---|---|---|---|---|---|---|---|---|---|
| Polyol 10 | 34.5 | 34.5 | 34.5 | 34.5 | 34.5 | 34.5 | 34.5 | 34.5 | 34.5 |
| Polyol 11 | 65.5 | 65.5 | 65.5 | 65.5 | 65.5 | 65.5 | 65.5 | 65.5 | 65.5 |
| water total | 4.0 | 4.0 | 4.0 | 4.0 | 4.0 | 4.0 | 4.0 | 4.0 | 4.0 |
| water added | 3.789 | 3.789 | 3.789 | 2.664 | 2.664 | 2.664 | 2.686 | 2.686 | 2.686 |
| Stabilizer 1 | 1.41 | 1.41 | 1.41 | 1.41 | 1.41 | 1.41 | 1.41 | 1.41 | 1.41 |
| Catalyst 1 | 0.12 | 0.12 | 0.12 | | | | | | |
| Catalyst 2 | 0.25 | 0.25 | 0.25 | | | | | | |
| Example 1 (50% in water) | | | | 2.25 | 2.25 | 2.25 | | | |
| Example 1A | | | | | | | 2.5 | 2.5 | 2.5 |
| Silicone Surf. 1 | 1.0 | 1.0 | 1.0 | 1.0 | 1.0 | 1.0 | 1.0 | 1.0 | 1.0 |
| Isocyanate 1, g | 45.85 | 45.85 | 45.85 | 45.84 | 45.84 | 45.84 | 45.81 | 45.81 | 45.81 |
| Batch Size, g | 490 | 490 | 490 | 490 | 490 | 490 | 490 | 490 | 490 |
| Room Temp, ° F. | 74 | 74 | 74 | 74 | 74 | 74 | 74 | 74 | 74 |
| Cream Time, sec. | 5 | 5 | 5 | 6 | 6 | 6 | 8 | 8 | 8 |
| Exit Time, sec. | 30 | 30 | 30 | 34 | 34 | 34 | 40 | 40 | 40 |
| Mold Temp, ° F. | 150 | 150 | 150 | 150 | 150 | 150 | 150 | 150 | 150 |
| Demold Time, min | 5 | 5 | 5 | 5 | 5 | 5 | 5 | 5 | 5 |
| Vent, inches | 1/16 | 1/16 | 1/16 | 1/16 | 1/16 | 1/16 | 1/16 | 1/16 | 1/16 |
| Pad Wt, g | 537 | 536 | 537 | 549 | 544 | 544 | 542 | 545 | 545 |

| | Density, pcf | Resiliency | Air Flow | IFD Thick | 25% IFD | 50% IFD | 65% IFD | 50/25 ratio | 65/25 ratio | 50% CFD | Tensile, psi | Elongation % | Tear, pli | 75% Comp, set, % | 50% HALL, % | 75% HACS, % | Wet Set, % |
|---|---|---|---|---|---|---|---|---|---|---|---|---|---|---|---|---|---|
| Avg. 46,47,48 | 2.19 | 64 | 2.39 | 3.75 | 37.52 | 66.05 | 100.5 | 1.76 | 2.68 | 0.34 | 21.78 | 99.35 | 1.52 | 9.67 | 0.98 | 21.94 | 11.06 |
| Avg. 49,50,51 | 2.20 | 64 | 2.39 | 3.78 | 38.52 | 68.07 | 102.5 | 1.77 | 2.86 | 0.36 | 21.33 | 89.85 | 1.65 | 13.71 | −9.19 | 33.26 | 11.15 |
| Avg. 52,53,54 | 2.21 | 59 | 3.53 | 3.79 | 45.10 | 80.67 | 120.3 | 1.79 | 2.67 | 0.43 | 25.12 | 121.8 | 2.39 | 11.9 | 3.10 | 21.13 | 11.46 |

In view of the many changes and modifications that can be made without departing from principles underlying the invention, reference should be made to the appended claims for an understanding of the scope of the protection to be afforded the invention.

What is claimed is:

1. A process for the synthesis of polyurethanes comprising reacting polyurethane-forming reactants in the presence of an effective amount of a catalyst comprising at least one alkylamino oxamide of the structure:

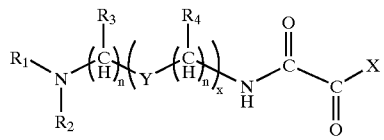

wherein:
$R_1$ and $R_2$ are independently selected alkyl groups or can be taken together to form a five or six-membered heterocyclic ring;
$R_3$ and $R_4$ are independently selected from the group consisting of hydrogen and alkyl;
n is 2 or 3;
x is 0 or 1;
Y is selected from the group consisting of O and $NR_9$,
wherein:
$R_9$ is selected from the group consisting of hydrogen and alkyl; and
X is selected from the group consisting of $OR_{10}$ and G, wherein:
$R_{10}$ is selected from the group consisting of hydrogen and alkyl; and G is

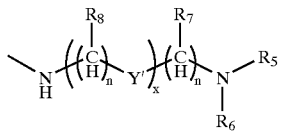

wherein:
$R_5$ and $R_6$ are independently selected alkyl groups or can be taken together to form a five or six-membered heterocyclic ring;
$R_7$ and $R_8$ are independently selected from the group consisting of hydrogen and alkyl;
n is 2 or 3;
x is 0 or 1; and
Y' is selected from the group consisting of O and $NR_{11}$,
wherein $R_{11}$ is selected from the group consisting of hydrogen and alkyl.

2. The process of claim 1 wherein the catalyst further comprises at least one hydroxy carboxylic acid.

3. The process of claim 1 wherein X is G.

4. The process of claim 2 wherein X is G.

5. The process of claim 1 wherein the catalyst comprises at least one member selected from the group consisting of bis{N-(N',N'-dimethylaminopropyl)}oxamide, bis{N-(N',N'-dimethylaminoethyl)}oxamide, bis{N-(3- imidazolidinylpropyl)}oxamide, bis{N-(N',N'-diethylaminoethyl)}oxamide, bis{N-(N',N'-diethylaminopropyl)}oxamide, bis{N-(N',N'-dibutylaminopropyl)}oxamide, bis{N-(N',N'-diethylamino-1-methylpropyl)}oxamide, and bis{N-(3-morpholinopropyl)}oxamide.

6. The process of claim 2 wherein the catalyst comprises at least one member selected from the group consisting of bis{N-(N',N'-dimethylaminopropyl)}oxamide, bis{N-(N',N'-dimethylaminoethyl)}oxamide, bis{N-(3-imidazolidinylpropyl)}oxamide, bis{N-(N',N'-diethylaminoethyl)}oxamide, bis{N-(N',N'-diethylaminopropyl)}oxamide, bis{N-(N',N'-dibutylaminopropyl)}oxamide, bis{N-(N',N'-diethylamino-1-methylpropyl)}oxamide, and bis{N-(3-morpholinopropyl)}oxamide.

7. The process of claim 2 wherein the hydroxy carboxylic acid is at least one member selected from the group consisting of salicylic acid, gluconic acid, dimethylol propionic acid, chloroacetic acid, m-hydroxybenzoic acid, p-hydroxybenzoic acid, gallic acid, syringic acid, tartaric acid, citric acid, 2-hydroxymethylpropionic acid, dihydroxybenzoic acid, glycolic acid, beta.-hydroxybutyric acid, cresotic acid, 3-hydroxy-2-naphthoic acid, lactic acid, malic acid, resorcylic acid, and hydroferulic acid.

8. The process of claim 7 wherein the hydroxy carboxylic acid is salicylic acid.

9. A polyurethane synthesized by a process comprising reacting polyurethane-forming reactants in the presence of an effective amount of a catalyst comprising at least one alkylamino oxamide of the structure:

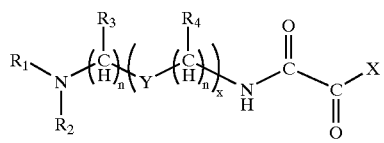

wherein:
R₁ and R₂ are independently selected alkyl groups or can be taken together to form a five or six-membered heterocyclic ring;
R₃ and R₄ are independently selected from the group consisting of hydrogen and alkyl;
n is 2 or 3;
x is 0 or 1;
Y is selected from the group consisting of O and NR₉, wherein:
R₉ is selected from the group consisting of hydrogen and alkyl; and
X is selected from the group consisting of OR₁₀ and G, wherein:
R₁₀ is selected from the group consisting of hydrogen and alkyl; and G is

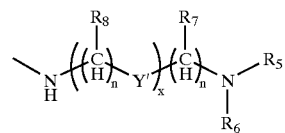

wherein:
R₅ and R₆ are independently selected alkyl groups or can be taken together to form a five or six-membered heterocyclic ring;
R₇ and R₈ are independently selected from the group consisting of hydrogen and alkyl;
n is 2 or 3;
x is 0 or 1; and
Y' is selected from the group consisting of O and NR₁₁,
wherein R₁₁, is selected from the group consisting of hydrogen and alkyl.

10. The polyurethane of claim 9 wherein the catalyst further comprises at least one hydroxy carboxylic acid.

11. The polyurethane of claim 9 wherein X is G.

12. The polyurethane of claim 10 wherein X is G.

13. The polyurethane of claim 9 wherein the catalyst comprises at least one member selected from the group consisting of bis{N-(N',N'-dimethylaminopropyl)}oxamide, bis{N-(N',N'-dimethylaminoethyl)}oxamide, bis{N-(3-imidazolidinylpropyl)}oxamide, bis{N-(N',N'-diethylaminoethyl)}oxamide, bis{N-(N',N'-diethylaminopropyl)}oxamide, bis{N-(N',N'-dibutylaminopropyl)}oxamide, bis{N-(N',N'-diethylamino-1-methylpropyl)}oxamide, and bis{N-(3-morpholinopropyl)}oxamide.

14. The polyurethane of claim 10 wherein the catalyst comprises at least one member selected from the group consisting of bis{N-(N',N'-dimethylaminopropyl)}oxamide, bis{N-(N',N'-dimethylaminoethyl)}oxamide, bis{N-(3-imidazolidinylpropyl)}oxamide, bis{N-(N',N'-diethylaminoethyl)}oxamide, bis{N-(N',N'-diethylaminopropyl)}oxamide, bis{N-(N',N'-dibutylaminopropyl)}oxamide, bis{N-(N',N'-diethylamino-1-methylpropyl)}oxamide, and bis{N-(3-morpholinopropyl)}oxamide.

15. The polyurethane of claim 10 wherein the hydroxy carboxylic acid is at least one member selected from the group consisting of salicylic acid, gluconic acid, dimethylol propionic acid, chloroacetic acid, m-hydroxybenzoic acid, p-hydroxybenzoic acid, gallic acid, syringic acid, tartaric acid, citric acid, 2-hydroxymethylpropionic acid, dihydroxybenzoic acid, glycolic acid, beta.-hydroxybutyric acid, cresotic acid, 3-hydroxy-2-naphthoic acid, lactic acid, malic acid, resorcylic acid, and hydroferulic acid.

16. The polyurethane of claim 15 wherein the hydroxy carboxylic acid is salicylic acid.

* * * * *